UNITED STATES PATENT OFFICE.

GEORGE C. KIESEWETTER, OF HOBOKEN, NEW JERSEY.

FIRE-KINDLER.

SPECIFICATION forming part of Letters Patent No. 301,243, dated July 1, 1884.

Application filed February 2, 1884. (No specimens.)

*To all whom it may concern:*

Be it known that I, GEORGE CHRISTIAN KIESEWETTER, of Hoboken, in the county of Hudson and State of New Jersey, have invented a new and useful Improvement in Fire-Kindlers, of which the following is a full, clear, and exact description.

The object of this invention is to promote convenience and economy in kindling coal-fires.

The invention consists of the following ingredients, combined in the proportions and manner stated, viz: resin, one hundred and forty-one pounds; benzine or flash-oil, sixty-six gallons; water, fifteen gallons; caustic soda, three pounds; raw oil, two gallons; nitrate of lead, four and one-half pounds; sulphate of magnesia, four pounds; sulphate of zinc, one and one-half pound, and sawdust.

In preparing my improved fire-kindlers I take one hundred and thirty pounds of resin and sixty-six gallons of benzine or flash-oil, boil them until the resin is melted, and then let the mixture cool. I then take ten gallons of water, and put into it three pounds of caustic soda, eleven pounds of resin, and two gallons of raw oil, and boil them until the resin is melted. I let the mixture stand two minutes, and then put into it four and a half pound of nitrate of lead, dissolved in two gallons of hot water, stir the mixture thoroughly, and let it stand for half an hour. I then add to the mixture four pounds of sulphate of magnesia dissolved in two gallons of hot water, stir it thoroughly, and then add one and a half pound of sulphate of zinc, dissolved in one gallon of hot water. I then draw off the water, melt the mixture, remove it from the fire, and add to it the mixture first described. I then stir into the mixture as much sawdust as will take up the moisture of the compound and mold the compound into the form of bricks or other desired form. The cakes thus formed are allowed to dry for four or five days, and the kindlers are then ready for use or market.

Having thus described my invention, what I claim as new, and desire to secure by Letters Patent, is—

The herein-described composition of matter to be used for kindling fires, consisting of resin, benzine or flash-oil, water, caustic soda, raw oil, nitrate of lead, sulphate of magnesia, sulphate of zinc, and sawdust in substantially the proportions specified.

GEORGE C. KIESEWETTER.

Witnesses:
JAMES T. GRAHAM,
EDGAR TATE.